US012270289B2

(12) United States Patent
Keeton

(10) Patent No.: US 12,270,289 B2
(45) Date of Patent: Apr. 8, 2025

(54) CYCLONIC DE-SANDER VESSEL

(71) Applicant: Kodiak Equipment Rentals, LLC, New Caney, TX (US)

(72) Inventor: Anthony Keeton, Springtown, TX (US)

(73) Assignee: Kodiak Equipment Rentals, LLC, New Caney, TX (US)

( * ) Notice: Subject to any disclaimer, the term of this patent is extended or adjusted under 35 U.S.C. 154(b) by 0 days.

(21) Appl. No.: 18/468,722

(22) Filed: Sep. 17, 2023

(65) Prior Publication Data

US 2024/0141771 A1 May 2, 2024

Related U.S. Application Data

(60) Provisional application No. 63/516,921, filed on Aug. 1, 2023, provisional application No. 63/381,562, filed on Oct. 30, 2022.

(51) Int. Cl.
*E21B 43/34* (2006.01)
*B04C 3/06* (2006.01)
*B04C 5/081* (2006.01)

(52) U.S. Cl.
CPC ................ *E21B 43/35* (2020.05); *B04C 3/06* (2013.01); *B04C 5/081* (2013.01)

(58) Field of Classification Search
CPC ........... E21B 43/35; B04C 3/06; B04C 5/081; B04C 5/04; B04C 5/103; B04C 5/14; B04C 5/185; B04C 9/00
See application file for complete search history.

(56) References Cited

U.S. PATENT DOCUMENTS

| | | | | |
|---|---|---|---|---|
| 4,636,308 | A | 1/1987 | Summers | |
| 4,779,992 | A | 10/1988 | Underwood | |
| 5,314,018 | A | 5/1994 | Cobb | |
| 5,431,236 | A | 7/1995 | Warren | |
| 5,472,620 | A | 12/1995 | Huang | |
| 5,814,230 | A | 9/1998 | Willis et al. | |
| 11,344,897 | B1 * | 5/2022 | Garcia Soule | B01D 21/267 |
| 2003/0168391 | A1 | 9/2003 | Tveiten | |
| 2004/0074838 | A1 | 4/2004 | Hemstock et al. | |
| 2005/0279715 | A1 | 12/2005 | Strong et al. | |
| 2008/0230222 | A1 | 9/2008 | Garstad et al. | |
| 2014/0373492 | A1 * | 12/2014 | Arefjord | B01D 45/12 55/462 |
| 2019/0039078 | A1 * | 2/2019 | Chuman | C10J 3/485 |

* cited by examiner

*Primary Examiner* — Jacob S. Scott
*Assistant Examiner* — Miraj T. Patel
(74) *Attorney, Agent, or Firm* — Peter L. Brewer; Thrive IP

(57) ABSTRACT

A cyclonic de-sander for a fluid stream. The cyclonic de-sander includes a pressure vessel, with a fluid inlet configured to deliver the fluid stream into the interior volume of the pressure vessel. The fluid inlet delivers the fluid stream in an eccentric manner, thereby forming a cyclone within the interior volume. The de-sander also includes a vortex tube residing vertically within the pressure vessel. The vortex tube comprises an upper end in fluid communication with the upper end of the pressure vessel, and a lower end in fluid communication with the interior volume. Additionally, the cyclonic de-sander includes a funnel. The funnel resides within the interior volume below the fluid inlet and below the lower end of the vortex tube. The funnel comprises a frusto-conical body configured to gravitationally receive solid particles from the fluid stream and inhibit the travel of solid particles back up the pressure vessel.

16 Claims, 15 Drawing Sheets

800

CYCLONIC DE-SANDER VESSEL

CROSS REFERENCE TO RELATED APPLICATIONS

This application claims the benefit of U.S. Ser. No. 63/381,562 entitled "Cyclonic De-Sander." That application was filed on Oct. 30, 2022.

This application further claims the benefit of U.S. Ser. No. 63/516,921, entitled "Cyclonic De-Sander Vessel." That application was filed on Aug. 1, 2023.

Each of these provisional applications is incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure and inventions herein. Accordingly, it should be understood that this section should be read in this light, and not necessarily as admissions of prior art.

FIELD OF THE INVENTION

The present disclosure relates to the field of oil and gas production operations. More specifically, the disclosure relates to a pressure vessel used to remove solid particles from a fluid stream. Preferably, the fluid stream is a hydrocarbon fluid stream.

Technology in the Field of the Invention

In connection with the production of oil and gas from a wellbore, some surface processing of fluids is frequently necessary. For example, the production of reservoir fluids causes a mixture of gas and liquid components to be brought to the surface. The gas, or compressible components, may comprise methane, ethane, propane and trace amounts of butane. In addition, the compressible components may include carbon dioxide, nitrogen and hydrogen sulfide.

The liquid, or incompressible components, typically comprise oil in the form of propane, butane, pentane, and possibly heavier (or C+) components. In addition, the incompressible components may and frequently will include brine. Dissolved minerals or precipitates, mostly commonly salts, will be dissolved in or otherwise be carried with the liquids.

The separation of lighter fluids from heavier fluids may be done in several ways. These include the use of gravity separation vessels, also referred to as three-phase separators. Three phase separators include an inlet that receives production fluids directly from the well head via a flow line. The inlet carries the production fluids into an inlet diverter within the separator. Gases rise to the top of this initial separation zone, while liquids gravitationally travel along the bottom of the vessel through pressure.

Subsequent phase separation occurs by means of gravity using, for example, weirs or baffles placed along the horizontal length of the separator. This will cause the oil phase to suspend, or to rise to the top of the aqueous phase, thus separating the oil from the brine. The oil will pass over the weirs into an oil chamber while water accumulates in a water chamber.

Each of the oil and water chambers in the three-phase separator will have its own dump valve. The dump valves are configured to release the water and the liquid into separate lines. At the same time, a gas release valve resides at the top of the vessel. The gas release valve is tuned to insure that it opens at a sufficiently high pressure to facilitate three-phase separation, but not so high as to cause liquids to back up and escape through the gas line (a condition which will typically cause an automatic shut-off of production at the wellhead, and which will likely require an engineer to be called out to restart production and possibly re-set the valves).

Fluid separators may also include zeolite (or other membrane) bed separators. In addition, so-called heater treaters may be employed to flash gas out of the fluid stream. These separators may be used individually or in series with a three-phase separator.

As noted, the production of reservoir fluids may also bring to the surface a variety of solid components, typically referred to as "fines." Fines may include clay particles that remain in the formation from the drilling mud. Commonly, fines will also include sand and/or shale particles emanating from the subsurface formation. These solid particles are released during the drilling process, during the hydraulic fracturing process, and even during ordinary flow-back and artificial lift.

The particle sizes of the solid fines will vary, such as from a few microns to several hundred microns in diameter. Particles below 100 microns in diameter are generally less of a concern for the downstream production equipment; on the other hand, sand particles having a diameter that is equal to or greater than 150 microns should be removed as these larger particles can cause damage to downstream equipment including dump valves, flowline valves, chokes, seats, pipelines and fluid separator connections. Sand particularly can cause both erosion of connections and the plugging of lines.

The removal of solid components from the fluid stream may be accomplished through the use of a centrifugal separator. Fluids are forced into a vessel under pressure from the side or at an end of the vessel. The fluids are directed into the wall of the cylindrical vessel. This natural fluid path creates a helical effect of the fluid inside the vessel.

A shortcoming of known centrifugal particle separators is the lack of efficiency in the separation of particles from the fluid stream. In practice, the separated solids contain a measure of water. Some have referred to the separated solids as "wet sand." The result of water content in the separated solids is that granular fines exit the separator in the form of a thick slurry. The slurry may be passed through a pipeline into a so-called sand accumulator. The sand accumulator represents a large storage vessel. In this vessel, the sand builds up as a deposit layer on the bottom of the storage vessel, with water remaining above. As the level of the sand rises, the sand displaces the overhead water upwardly so that, in effect, there is a discharge of wet sand from the underflow outlet into the accumulator and then a transport of water through a line that leads back to the separator. Periodically, sand may be removed from the sand accumulator to make space available for the accumulation of additional sand. As necessary, the sand may be rinsed and then taken away for dumping or for a future formation fracturing operation.

A need exists for a cyclonic de-sander that is capable of removing sand and other solid particulates using less water. In other words, a need exists for a more efficient de-sander so that a drier sand is released. A need further exists for a sand separation vessel that utilizes a funnel within an interior volume, with the size and position of the funnel within the vessel being designed to optimize sand removal.

BRIEF SUMMARY OF THE INVENTION

A cyclonic de-sander is provided herein. The cyclonic de-sander first comprises a pressure vessel. The pressure vessel has a side wall with an upper end and a lower end, all forming an interior volume. In one arrangement, a longitudinal axis of the pressure vessel is vertical in orientation, with the pressure vessel being between 8 and 12 feet in height.

The de-sander also comprises a fluid inlet. The fluid inlet is configured to deliver a fluid stream into the interior volume of the pressure vessel in an eccentric manner. In this way, when the fluid stream is introduced under pressure, a cyclone is formed within the interior volume as the fluid swirls along the inner wall.

The fluid stream may comprise hydrocarbon liquids. Typically, the fluid stream will comprise primarily water, or brine. In either instance, the fluid stream carries solid particles. The solid particles will be primarily sand (a generic term for finely divided mineral particles). The sand concentration is high enough as to warrant the need for a dedicated de-sander vessel.

The de-sander also has a vortex tube. The vortex tube resides vertically within the interior volume of the pressure vessel. The vortex tube comprises an upper end residing at the upper end of the pressure vessel, and a lower end in fluid communication with an environment of the interior volume. Preferably, the upper end of the pressure vessel comprises an upper fluid valve. During operation, de-sanded fluid discharges through the upper fluid valve.

The cyclonic de-sander further comprises a funnel. The funnel resides within the interior volume of the pressure vessel. Specifically, the funnel resides below the fluid inlet and below the lower end of the vortex tube. The funnel comprises a frusto-conical body having an upper end and a lower end. The upper end defines a first inner diameter while the lower end defines a second inner diameter. The first inner diameter is greater than the second inner diameter.

A distance D separates the fluid inlet from the upper end of the funnel. Preferably, the distance D represents between 35% and 55% of a total height of the interior volume of the pressure vessel. More preferably, the distance D represents between 35% and 45% of a total height of the interior volume of the pressure vessel.

The funnel is configured to create a pressure drop within the interior volume of the pressure vessel. In one aspect, the pressure drop is at least 10 psi below the funnel relative to above the funnel. More specifically, the funnel is configured to create a pressure drop of at least 10 psi below the funnel relative to the environment of the interior volume proximate the lower end of the vortex tube. The funnel gravitationally receives solid particles from the fluid stream. At the same time, the funnel inhibits the travel of the solid particles back up the interior volume of the pressure vessel once they have traveled down through the funnel.

In one embodiment, the lower end of the vortex tube resides between 4 and 12 inches below the fluid inlet. At the same time, the upper end of the funnel resides at least 24 inches below the fluid inlet, and more preferably between 40 inches and 55 inches below the fluid inlet.

A method of operating a cyclonic de-sander is also provided herein. In one aspect, the method first includes providing a pressure vessel. The pressure vessel includes a fluid inlet. The fluid inlet is configured to receive a stream of pressurized production fluids.

In one embodiment, the pressure vessel comprises:

a side wall, an upper end, a lower end, and an interior volume.

The method next comprises determining a fluid pressure passing through the fluid inlet. The pressure may be as high as 5,000 psig, or even 7,000 psig. The pressurized production fluids are introduced into the pressure vessel through the fluid inlet.

The method also includes determining a height and an inner diameter of the pressure vessel. The purpose is to determine a processing capacity of the cyclonic de-sander.

The method additionally comprises determining optimum dimensions for a vortex tube within the pressure vessel. Ideally, the fluid inlet and the vortex tube are both positioned above a mid-point of the height of the pressure vessel. Ideally, the vortex tube will have an upper end in fluid communication with a fluid outlet, and a lower end that is open to the operating environment (or interior volume) within the pressure vessel.

The method further includes determining optimum dimensions for a funnel within the pressure vessel. The funnel defines a frusto-conical body. The frusto-conical body has an upper end and a lower end. The upper end has a first inner diameter that defines an upper opening. At the same time, the lower end has a second inner diameter that defines a lower opening. In one aspect, the first inner diameter approximates the inner diameter of the side wall of the pressure vessel. Additionally, the first inner diameter is larger than the second inner diameter.

In accordance with the frusto-conical profile, the body of the funnel is angled relative to the side wall of the pressure vessel. Determining dimensions of the funnel will include determining this angle of deviation. Determining dimensions of the funnel will also include determining a height of the funnel and determining the first and second inner diameters.

The method additionally comprises determining an optimum location for the funnel below the fluid inlet. Preferably, the upper end of the funnel resides between 40 inches and 55 inches below the fluid inlet. In one aspect, the upper end of the funnel is placed a distance D below the fluid inlet, wherein the distance D represents between about 35% and 45% of the height of the pressure vessel.

The method improves the efficiency of operating a cyclonic de-sander. In this respect, an improved separation of sand from a production stream is obtained. Stated another way, a drier sand is released out of the lower end of the pressure vessel.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the disclosures herein may admit to other equally effective embodiments and applications.

DETAILED DESCRIPTION OF CERTAIN EMBODIMENTS

Definitions

Figure 1A:
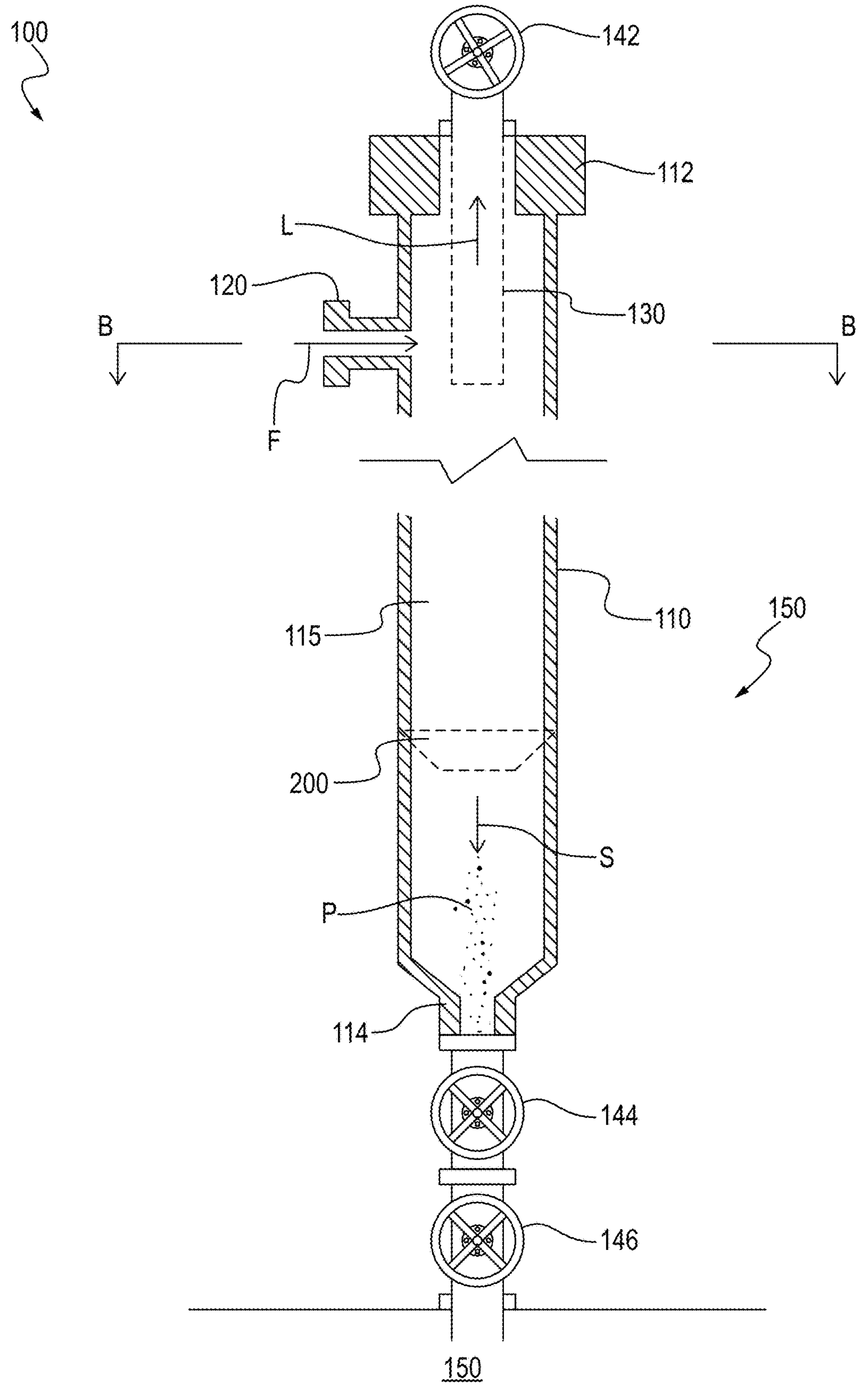
FIG. 1A is a cross-sectional view of a cyclonic de-sander of the present invention, in one embodiment.

For purposes of the present application, it will be understood that the term "hydrocarbon" refers to an organic compound that includes primarily, if not exclusively, the elements hydrogen and carbon. Hydrocarbons may also include other elements, such as, but not limited to, halogens, metallic elements, nitrogen, oxygen, and/or sulfur.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient condition. Hydrocarbon fluids may include, for example, oil, natural gas, coalbed methane, shale oil, pyrolysis oil, pyrolysis gas, a pyrolysis product of coal, and other hydrocarbons that are in a gaseous or liquid state.

As used herein, the terms "produced fluids," "reservoir fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, oil, natural gas, pyrolyzed shale oil, synthesis gas, a pyrolysis product of coal, oxygen, carbon dioxide, hydrogen sulfide and brine. In the present application, the produced fluids will include sand.

The term "sand" includes any granular mineral particles and any fines. Non-limiting examples of sand include silica-sand used in a fracking operation, and particles of sandstone and shale derived from a subsurface formation.

As used herein, the terms "fluid" or "fluid stream" refer to gases, liquids, and combinations of gases and liquids, as well as to combinations of liquids and fines.

As used herein, the term "wellbore fluids" means water, hydrocarbon fluids, formation fluids, or any other fluids that may be within a wellbore during a production operation.

As used herein, the term "gas" refers to a fluid that is in its vapor phase.

As used herein, the term "subsurface" refers to geologic strata occurring below the earth's surface.

As used herein, the term "formation" refers to any definable subsurface region regardless of size. The formation may contain one or more hydrocarbon-containing layers, one or more non-hydrocarbon containing layers, an overburden, and/or an underburden of any geologic formation. A formation can refer to a single set of related geologic strata of a specific rock type, or to a set of geologic strata of different rock types that contribute to or are encountered in, for example, without limitation, (i) the creation, generation and/or entrapment of hydrocarbons or minerals, and (ii) the execution of processes used to extract hydrocarbons or minerals from the subsurface.

As used herein, the term "wellbore" refers to a hole in the subsurface made by drilling or insertion of a conduit into the subsurface. A wellbore may have a substantially circular cross section, or other cross-sectional shapes. The term "well," when referring to an opening in the formation, may be used interchangeably with the term "wellbore." The term "bore" refers to the diametric opening formed in the subsurface by the drilling process.

Description of Selected Specific Embodiments

FIG. 1A is a side, cross-sectional view of a cyclonic de-sander 100 of the present invention, in one embodiment. The cyclonic de-sander 100 is designed to serve as a sand separator. Specifically, the cyclonic de-sander 100 separates sand, or granular fines and materials, from a fluid stream.

Beneficially, the cyclonic de-sander 100 is tuned to remove a high percentage of sand from the fluid stream relative to known sand separators.

The cyclonic de-sander 100 first comprises a side wall 110. In the arrangement of FIG. 1A, the side wall 110 has a circular profile, with a major axis in the vertical orientation. The side wall 110 has an upper end 112 and a lower end 114. Together, the side wall 110 and the opposing upper 112 and lower 114 ends form a pressure vessel 150 having an interior volume 115.

The side wall 110 may be, for example, a ½" vessel rated to 8,000 psi. The interior volume 115 may hold up to 100 gallons of fluid. The length of the side wall 110 from lower end 114 to upper end 112 may be between 9 and 11 feet. At the same time, the outer diameter of the side wall 110 may be between 1.5 and 2.5 feet. In one aspect, the outer diameter is 24 inches while a corresponding inner diameter is between 14.5 and 22 inches.

An upper hand wheel 142 is provided proximate the upper end 112 of the de-sander 100. The upper hand wheel 142 controls a corresponding valve that regulates the egress of fluids during operation of the de-sander 100. At the opposing end of the vessel 150, first and second lower hand wheels 144, 146 are provided at the lower end 114 of the de-sander 100. The first lower hand wheel 144 receives sand (and other solid particles) during operation of the de-sander 100. A filter (not shown) may reside proximate the first lower hand wheel 144. The filter collects sand while allowing water to pass down to the second lower hand wheel 146.

The hand wheels 142, 144, 146 are illustrative of any known valve that may be used in connection with fluid processing. In one aspect, the valves are gate valves that may be remotely controlled via a servo drive. In another aspect, the valves are butterfly valves that may be controlled and throttled locally via the hand wheels 142, 144, 146.

The de-sander 100 also comprises a fluid inlet 120. The fluid inlet 120 is in fluid communication with a flow line (not shown). In one aspect, the flow line receives production fluids from a wellhead. Optionally, the de-sander 100 may be placed between the wellhead and a downstream three-phase separator. In this way, sand and other solid particles may be removed from the fluid stream before entering the three-phase (or other) fluid separator and downstream flow lines.

In one aspect, the production fluids comprise so-called flowback water. Flowback water is brine that is returned to the surface following a hydraulic formation fracturing operation. Those of ordinary skill in the art will understand that flowback water carries large amounts of sand (including shale fines and drilling mud particles). In this instance, the flowback water is introduced into the pressure vessel 150 through the fluid inlet 120.

In another aspect, the flow stream comprises produced and separated water. The water is received from a dump valve associated with the water chamber of a three-phase fluid separator. Some of the solid particles from the wellbore fluids will settle in the water chamber and be released through the associated dump valve.

Alternatively, the fluid stream comprises oil received from a dump valve associated with the three-phase fluid separator. In other words, the flow line carries oil that is accumulated in the oil chamber of the three-phase fluid separator. The oil is released from the oil chamber through an associated dump valve and then released from the fluid inlet 120 into the interior volume 115 of the pressure vessel 150.

In any instance, in the arrangement of FIG. 1A, the fluid inlet 120 is positioned proximate the upper end 112 of the side wall 110. In one aspect, the side wall 110 is 10 feet in height, and the fluid inlet 120 is positioned 1 foot from the upper end 112. Arrow F demonstrates the movement of a fluid stream into the interior volume 115 of the de-sander 100. The fluid stream F may comprise primarily brine, or it may comprise primarily hydrocarbon liquids, or it may be a mixture of brine and hydrocarbon liquids.

In a preferred embodiment, the flow stream F represents flowback water carrying sand (including drilling mud particles and/or shale fines).

Figure 1B:
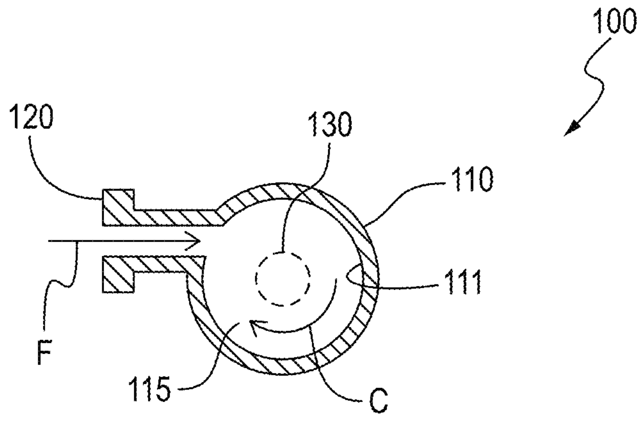
FIG. 1B is another cross-sectional view of the cyclonic de-sander of FIG. 1A, taken across Line B-B of FIG. 1A.

FIG. 1B is another cross-sectional view of the cyclonic de-sander 100 of FIG. 1A. Here, the view is taken across Line B-B of FIG. 1A. Line B-B is specifically taken across the fluid inlet 120. It can be seen that the fluid inlet 120 is positioned to introduce the fluid stream F into the interior volume 115 in an eccentric manner. In this respect, the fluid stream F is introduced adjacent an inner surface 111 of the side wall 110.

The fluid stream F moves into the interior volume 115 under pressure, such as at 6,000 psig. As the fluid stream F enters the interior volume 115, the fluid stream F immediately engages the inner surface 111 of the side wall 110. The arcuate shape of the side wall 110 causes the fluid stream F to begin circulating rapidly along the inner surface 111 of the side wall 110. Movement of the fluid stream F is illustrated at Arrow C, indicative of a "cyclone" effect. The purpose of the cyclone C is to force solid particles P (shown in FIG. 1A) against the side wall 110 of the pressure vessel 150. Downward movement of the solid particles P (such as frack sand) is indicated by Arrow S (also shown in FIG. 1A).

The cyclonic de-sander 100 also includes a vortex tube 130. The vortex tube 130 represents a cylindrical tube that resides within the interior volume 115 of the pressure vessel 150. Preferably, the vortex tube 130 is positioned concentrically within the side wall 110 and offers a 2-inch inner diameter.

The vortex tube 130 extends from the upper end 112 of the side wall 110 and down into the interior volume 115 just below the fluid inlet 120. Thus, the top of the vortex tube 130 is exposed to the atmosphere when the upper valve 142 is opened, while being exposed to in excess of 5,000 psig at the bottom of the tube 130 and within the interior volume 115. As the fluid stream F rapidly circulates around the side wall 110, a pressure differential from the upper hand wheel 142 pulls the fluid stream F up through the upper end 112 of the de-sander 100 for discharge. This discharge, which may be a water stream, is indicated by Arrow L (shown in FIG. 1A).

Of interest, the cyclonic de-sander 100 also includes a funnel 200. The funnel 200 is disposed within the interior volume 115 of the side wall 110. The funnel 200 forms a constricted opening for the solid particles P as they move down the side wall 110. The funnel 200 resides below both the fluid inlet 120 and the vortex tube 130.

Figure 2A:
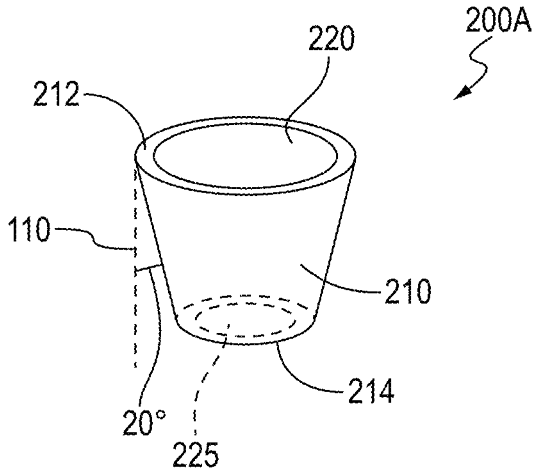
FIG. 2A is a perspective view of a funnel that is placed inside the cyclonic de-sander of FIG. 1A, in a first embodiment.

FIG. 2A is a perspective view of a funnel 200A that is placed inside the cyclonic de-sander 100 of FIG. 1A, in a first embodiment. It can be seen that the funnel 200A defines a frusto-conical body 210. The body 210 has an upper end 212 and a lower end 214.

The upper end 212 has an upper opening which defines a first inner diameter 220. At the same time, the lower end 214 has a lower opening that defines second inner diameter 225. The first inner diameter 220 approximates the inner diameter of the side wall 110, and is larger than the second inner diameter 225.

In accordance with the frusto-conical profile, the body 210 of the funnel 200A is angled relative to the side wall 110. In the arrangement of FIG. 2A, the angle is 20°. Of course, this angle may be adjusted. Adjusting the angle of the body 210 will also adjust the size of the second inner diameter 225. Adjusting the angle of the body 210 also affects a pressure differential within the interior volume 115. In this respect, pressure within the interior volume 115 will be higher above the funnel 200A as compared to below the funnel 200A.

Figure 2B:
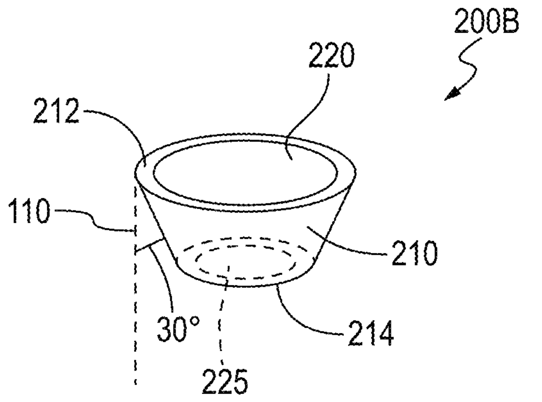
FIG. 2B is a perspective view of the funnel that is placed within an interior volume of the cyclonic de-sander of FIG. 1A, in a second embodiment.

FIG. 2B is a perspective view of a funnel 200B that may be placed inside the cyclonic de-sander 100 of FIG. 1A, in a second embodiment. Here, the relative angle between the body 210 and the side wall 110 is increased to 30°. This reduces the size of the second inner diameter 225. At the same time, the pressure differential within the interior volume 115 is increased.

Figure 2C:
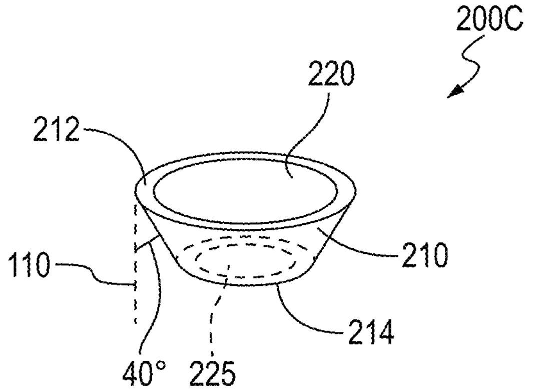
FIG. 2C is a perspective view of the funnel that is placed within an interior volume of the cyclonic de-sander of FIG. 1A, in a third embodiment.

FIG. 2C is a perspective view of a funnel 200C that may be placed inside the cyclonic de-sander 100 of FIG. 1A, in a third embodiment. Here, the relative angle between the body 210 and the side wall 110 is increased to 40°. This further reduces the size of the second inner diameter 225 while further increasing the pressure differential within the interior volume 115.

The introduction of the funnel 200 (wherein 200 represents any of funnels 200A, 200B and 200C) provides a venturi effect within the interior volume 115 of the de-sander 100. In this respect, the funnel 200 creates a pressure depression below the cyclone C. As solid particles P drop through the funnel 200, they are unable to return back through the second inner diameter 225 (or lower end 214) due to the higher pressure regime above the funnel 200.

In one aspect, two funnels 200 are employed within the inner volume 115, with a first funnel being directly over a second funnel. Preferably, each of a first and second funnel has the same profile, that is, the same angle between the body 210 and the side wall 110. Each of the first and second funnels will have:

an upper end defining a first inner diameter; and a lower end defining a second inner diameter;

wherein the upper end engages the surrounding inner wall of the pressure vessel.

Preferably, the second funnel is located between 3 to 8 inches below the first funnel.

It is observed that FIGS. 2A, 2B and 2C provide a sequence of progressively shorter lengths of the funnel body 210. In theory, the funnel body 210 could be so short that a plate (rather than a true funnel) is formed. In this instance, the funnel 200 would no longer have an upper end 212 and a lower end 214. Instead, this theoretical funnel body 200 would essentially be a horizontal plate with a large concentric hole. While this would work in theory, it is believed that the optimum funnel arrangement is a body 210 having an angle of deviation relative to the side wall 110 that is between 30° and 60°. It is also believed that the optimum funnel arrangement provides a body 210 that is between 4 and 8 inches in length, that is, the height of the funnel is between 4 and 8 inches in length. Solid particles P forced below the funnel 200 from the natural flow of the internal cyclone C will be unable to return to the fluid stream F due to the pressure differential created by the frusto-conical body 210, and of course due to the obstacle provided by the frusto-conical body 210 itself.

In any arrangement, the funnel 200 is placed below the vortex tube 130. In one aspect, a lower end of the vortex tube 130 is between 2 inches and 12 inches below the fluid inlet 120, while the upper end 212 of the funnel 200 resides between 40 inches and 60 inches below the fluid inlet 120, and more preferably between 42 inches and 55 inches below the fluid inlet 120.

Beneficially, adding the funnel 200 below the end of the cyclone C (proximate the bottom of the vortex tube 130) increases velocity in the cyclone C, causing greater centrifugal force. This causes a more efficient removal of solid particles P from the flow path F. In addition, the pressure drop below the funnel 200 will hold all solid particles P below the funnel 200, urging the solid particles P to gravitationally travel to the lower end 114 of the pressure vessel 150. Depending on funnel 200 configuration, this beneficially and unexpectedly improves the efficiency of sand capture by about 35%.

The solid particles P will fall towards the lower end 114 of the side wall 110. This is due to a combination of gravity and the pressure differential described above. From there, the solid particles P will exit the de-sander 100 through the lower valve 144. Optionally, a filtration medium is provided along the bottom end 114 at the lower valve 144 that collects solid particles P and moves them away from the pressure vessel 150.

It is understood that the solid particles P are not in a dry form; rather, they are part of a sand slurry. However, it is believed that use of the funnel 200 creates a sand with a lower water content. This is a significant improvement as the pressure vessel 150 itself is designed to process approximately 80 to 100 barrels of fluid per hour. Thus, many hundreds of pounds of substantially dry sand are dumped through the lower valve 144.

Figure 1C:
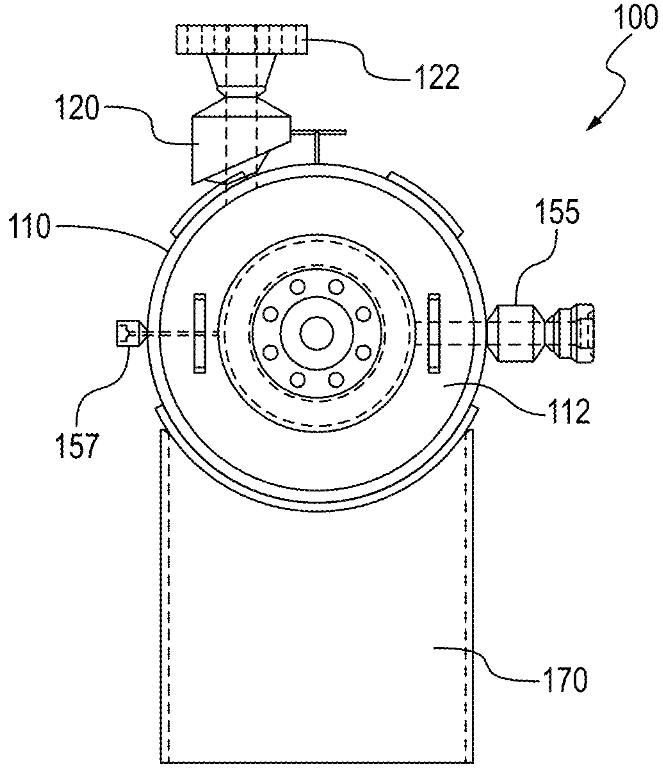
FIG. 1C is a top, plan view of the cyclonic de-sander of FIG. 1A, in a modified embodiment.

FIG. 1C is a top, plan view of the cyclonic de-sander 100 of FIG. 1A. Here, the upper end 112 of the pressure vessel 150 is seen. The outer wall 110 is also shown. Also, the fluid inlet 120 is provided, in a modified arrangement. A flange 122 is provided as part of the fluid inlet 120. The flange 122 allows the fluid inlet 120 to be placed in fluid communication with an incoming fluid stream (not shown) such as flowback fluids or production fluids.

FIG. 1C provides several optional features not presented in FIG. 1A. The first such feature is a clean-out nozzle 155. The clean-out nozzle 155 extends out from the side wall 110. During a sand separation operation, the clean-out nozzle 155 is capped. However, for purposes of clean-out, the cap (not shown) may be removed and the nozzle 155 may be fitted with a high pressure hose (also not shown). The hose allows an operator to inject water and, optionally, chemicals for cleaning out the pressure vessel 150. Clean-out fluids may be injected into the nozzle 155 and then released through valves 142 or 144.

As an alternative to the clean-out nozzle 155, or in addition, nozzle 157 is provided opposite the clean-out nozzle 155. The nozzle 157 may be used as an autoclave, that is, a nozzle for the injection of steam, fungicides and biocides. These cleaning fluids may be released from the pressure vessel 150 through the clean-out nozzle 155. Thereafter, the cap is placed back onto the clean-out nozzle 155.

Also shown in FIG. 1C is a saddle 170. The saddle 170 serves as a lateral support member for the cyclonic de-sander 100 when the de-sander 100 is being transported. Those of ordinary skill in the art will understand that there will typically be two or three saddles 170 placed along the side wall 110 of the de-sander 100. Weld pads (not shown) are used to connect the saddles 170 to the side wall 110.

For transport, the de-sander 100 is turned on its side so as to rest on the saddles 170. The saddles 170, in turn, are lifted onto and off of a flat-bed trailer using straps or crane-hooks. Optionally, the saddles 170 may be secured to a skid for transport.

Figure 3A:
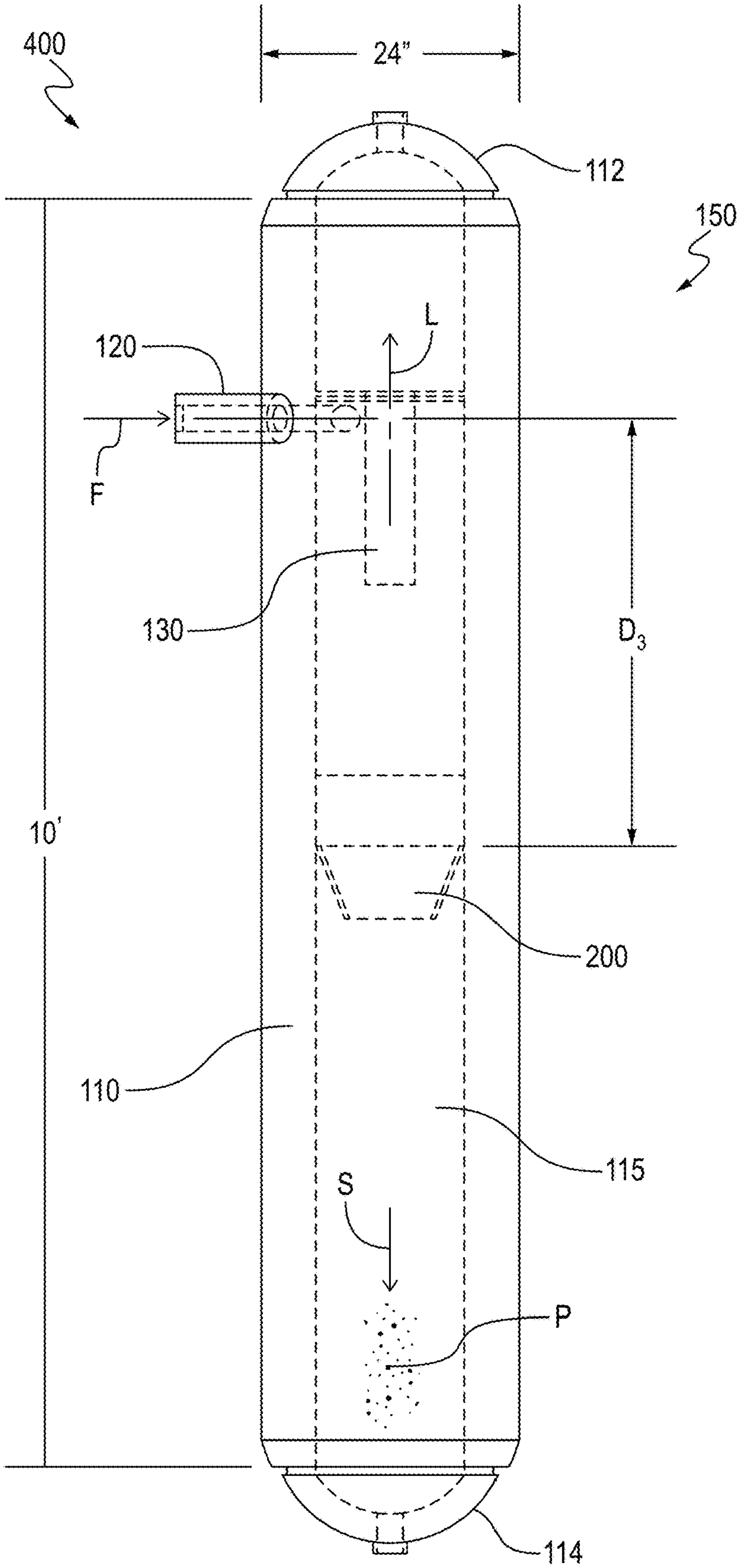
FIG. 3A is a side cross-sectional view of a cyclonic de-sander of the present invention. Here, the funnel is positioned a distance $D_3$ below the fluid inlet.

In accordance with the claims herein, a tuned placement of the funnel 200 below the fluid inlet 120 affects the amount, or percentage, of solid particles P removed from the cyclonic de-sander 100 during operation. FIG. 3A is a side cross-sectional view of a cyclonic de-sander 300 of the present invention. This is intended to be a more schematic presentation of the de-sander 100 of FIG. 1A. In this example, the vessel 150 is 10 feet in height and two feet in (outer) diameter. In addition, the vessel 150 has an inner diameter of between 14.5 and 22.0 inches.

In FIG. 3A, the funnel 200 is positioned within the interior volume 115 a distance $D_3$ below the fluid inlet 120. In this instance, $D_3$ may be, for example, 40 inches. This is considered a short distance compared to the overall height of the pressure vessel 150. For example, 40 inches may represent only about 30% of the length of the interior volume 115.

Figure 3B:
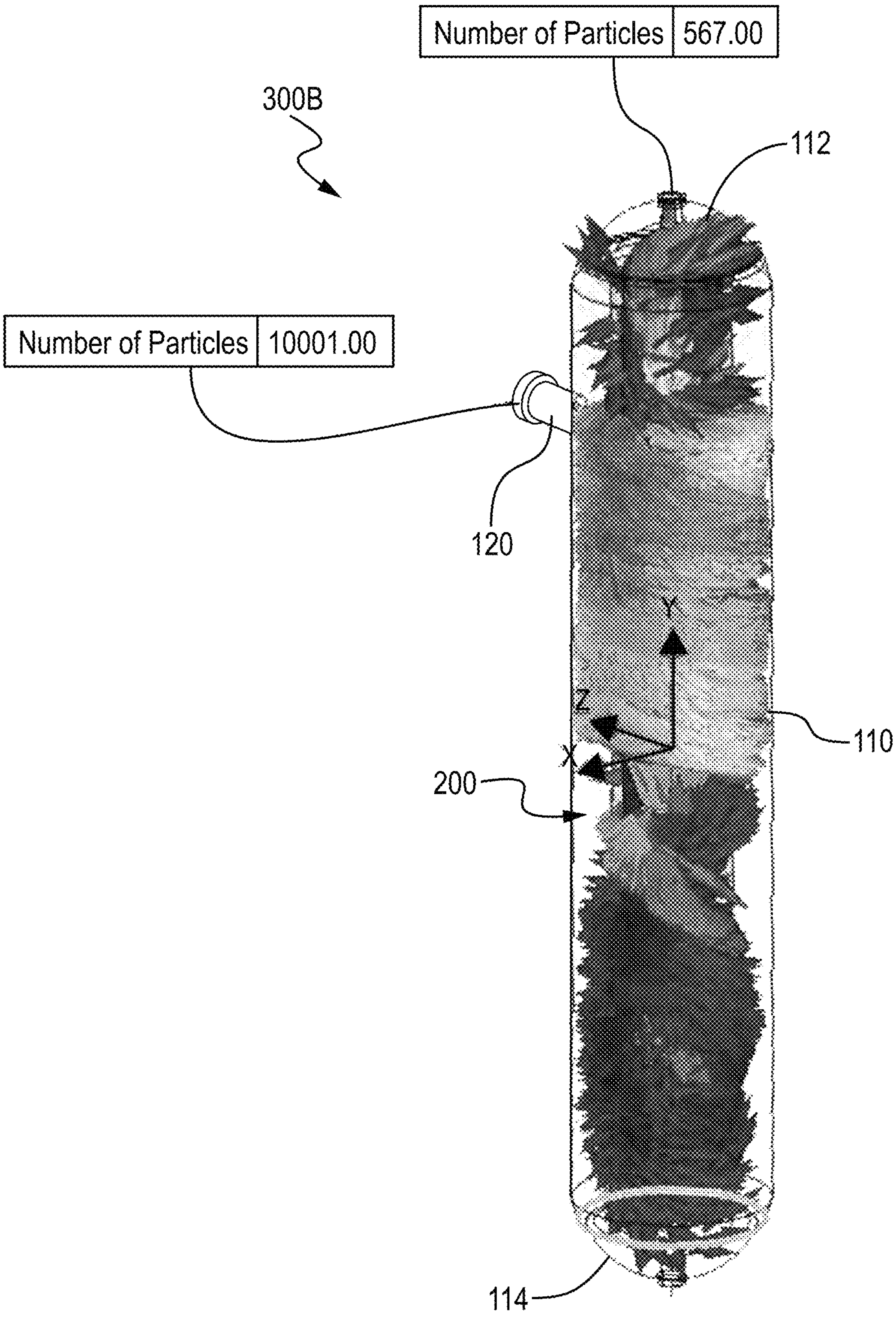
FIG. 3B is a computer-generated graphic using CFD analysis. The graphic shows different levels of particle separation within the cyclonic de-sander of FIG. 3A.

FIG. 3B is a computer-generated graphic 300B using Computational Fluid Dynamics ("CFD") analysis. The graphic 300B shows different levels of particle separation within the cyclonic de-sander 300 of FIG. 3A. Liquid pressure in the vessel 150 is 6,000 psi, which approximates experiences in the field. At this pressure and with these vessel dimensions, fluid (water or a hydrocarbon fluid that includes water) flows at the rate of 80 to 100 bbl/hour.

In the graphic 300B of FIG. 3B, it is observed that out of nominally 10,000 granular particles assumed in the simulation, 567.00 particles escaped with the water stream L at the upper end 112 of the vessel 150. When compared with a simulation that did not comprise a funnel 200, 442.00 particles escaped with the water stream L at the upper end 112 of the vessel 150. Thus, use of funnel 200 at position $D_3$ provides no improvement over the use of no funnel, and is fact around 30% worse.

Figure 4A:
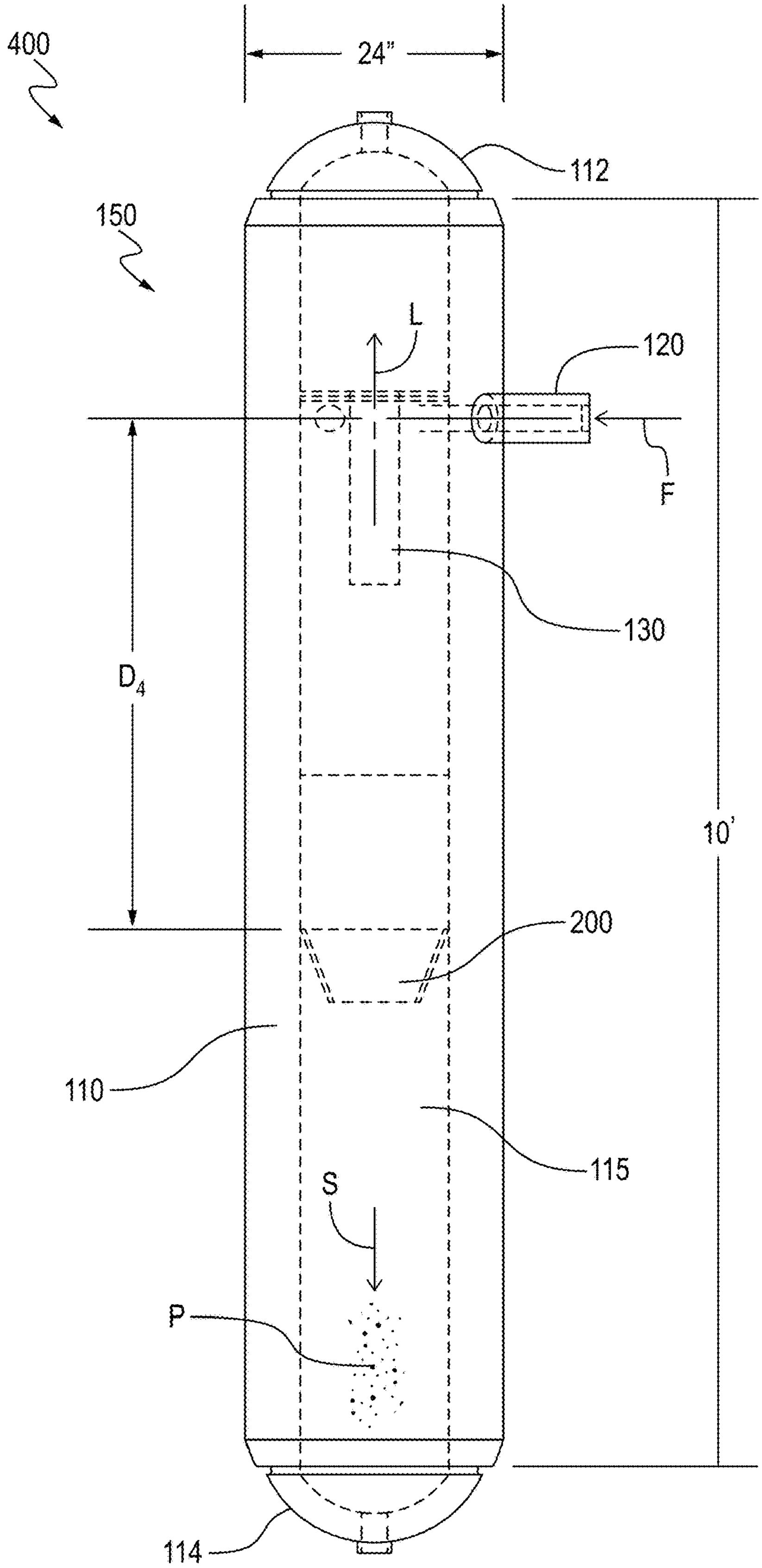
FIG. 4A is a side cross-sectional view of a cyclonic de-sander of the present invention, in a second embodiment. Here, the funnel is positioned a distance $D_4$ below the fluid inlet.

FIG. 4A is a side cross-sectional view of a cyclonic de-sander 400 of the present invention, in a second embodiment. De-sander 400 comprises the same outer dimensions and internal features as de-sander 300; however, in de-sander 400 the funnel 200 is positioned a distance $D_4$ below the fluid inlet 120. Distance $D_4$ is greater than distance $D_3$ and may be, for example, 48 inches.

Figure 4B:
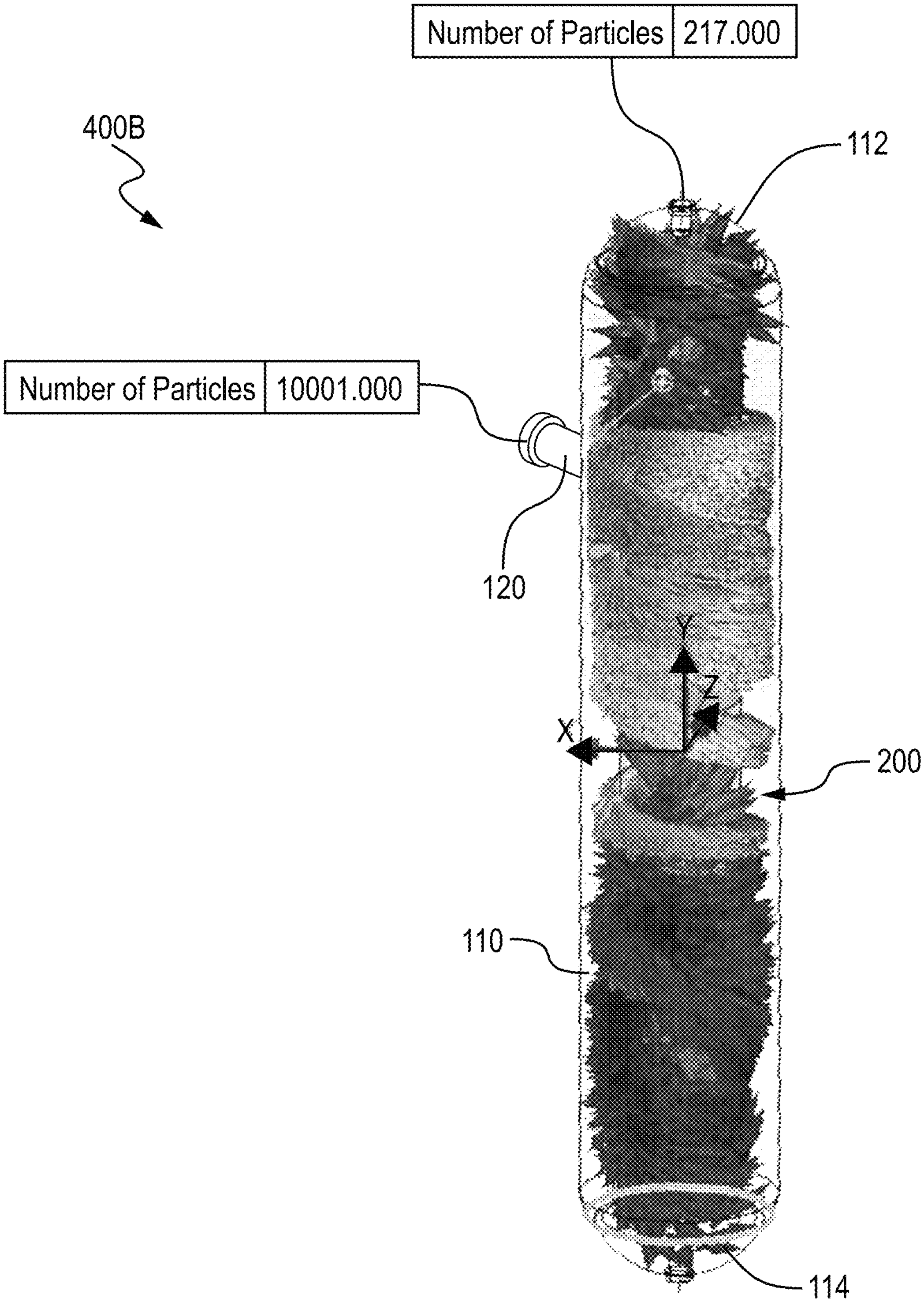
FIG. 4B is a computer-generated graphic using CFD analysis. The graphic shows different levels of particle separation within the cyclonic de-sander of FIG. 4A.

FIG. 4B is another computer-generated graphic 400B using CFD analysis. The graphic 400B again shows different levels of particle separation within the cyclonic de-sander 400 of FIG. 4A. It is observed that out of 10,001 granular particles assumed in the simulation, 217.00 particles escaped with the water stream L at the upper end 112 of the vessel 150. This is a marked improvement over the funnel 200 position of FIG. 3A. In other words, merely adjusting the location of the funnel 200 downward by 8 inches produced a roughly 50% decrease in sand particles escaping compared to the use of no funnel at all.

Figure 5A:
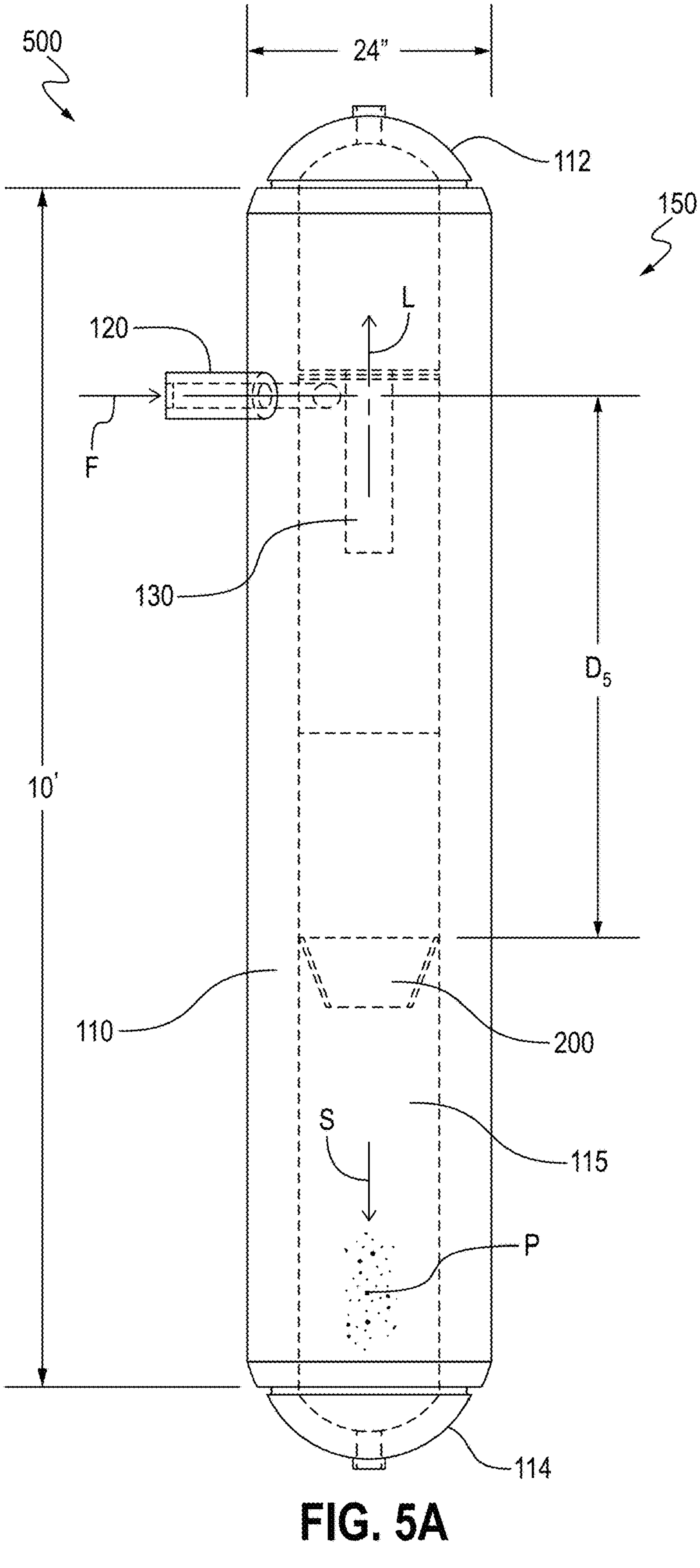
FIG. 5A is a side cross-sectional view of a cyclonic de-sander of the present invention, in a third embodiment. Here, the funnel is positioned a distance $D_5$ below the fluid inlet.

FIG. 5A is a side cross-sectional view of a cyclonic de-sander 500 of the present invention, in a third embodiment. De-sander 500 has the same outer dimensions and internal features as de-sanders 300 and 400; however, in de-sander 500 the funnel 200 is positioned a distance $D_5$ below the fluid inlet 120. Distance $D_5$ is greater than distances $D_3$ and $D_4$ and may be, for example, 54 inches.

Figure 5B:
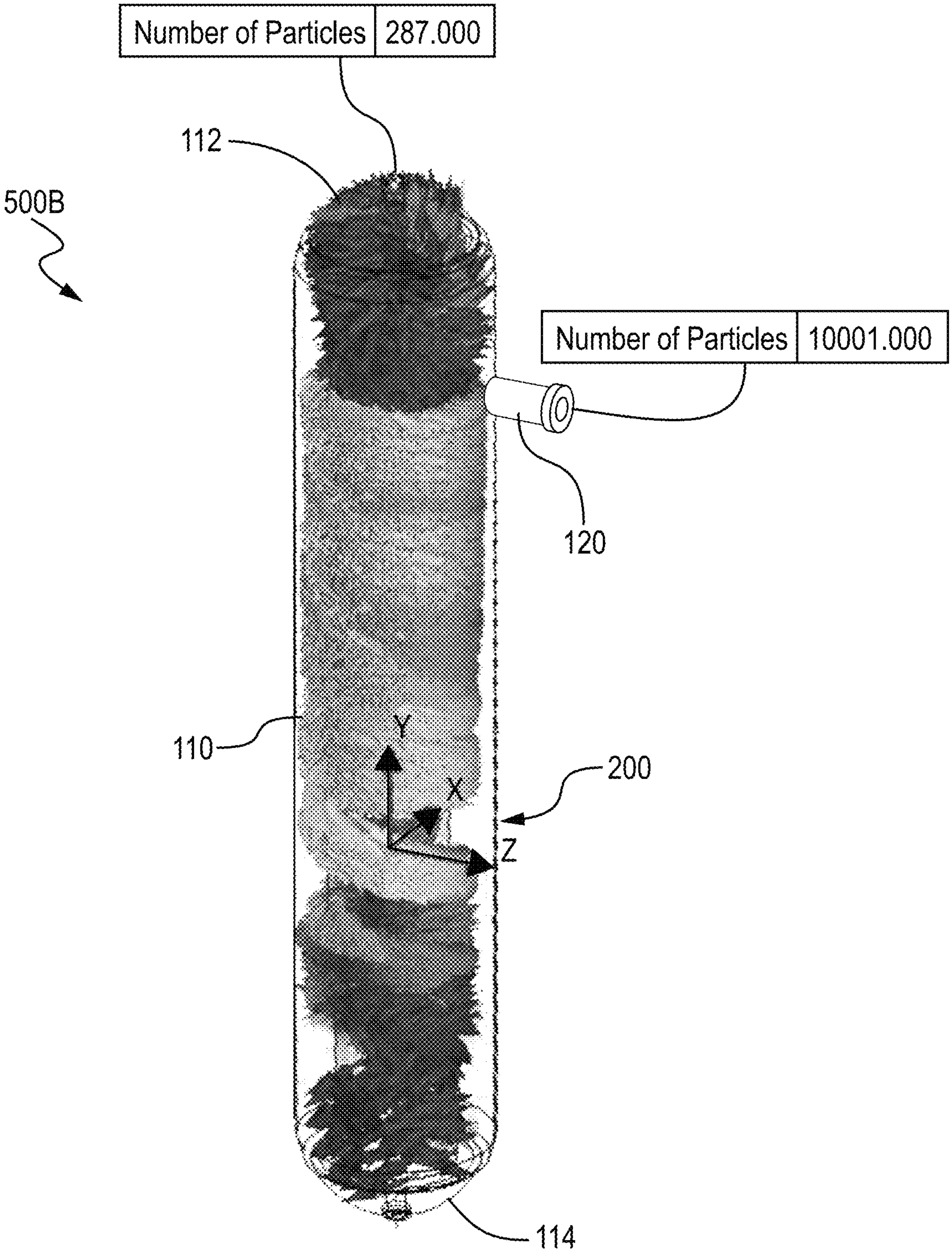
FIG. 5B is a computer-generated graphic using CFD analysis. The graphic shows different levels of particle separation within the cyclonic de-sander of FIG. 5A.

FIG. 5B is a computer-generated graphic 500B using CFD analysis. The graphic 500B shows different levels of particle separation within the cyclonic de-sander 500 of FIG. 5A. It is observed that out of 10,000 granular particles assumed in the simulation, 287.00 particles escaped with the water stream L at the upper end 112 of the vessel 150. This is an improvement over both the funnel 200 position of FIG. 3A and the simulation devoid of the funnel 200; however, the graphic 500B, which represents the funnel 200 position at the distance $D_5$, does not demonstrate quite the success of funnel 200 of FIG. 4A, that is, the funnel 200 is placed at distance $D_4$. Thus, 48 inches appears to be an optimum distance for this size of pressure vessel 150.

Figure 6A:
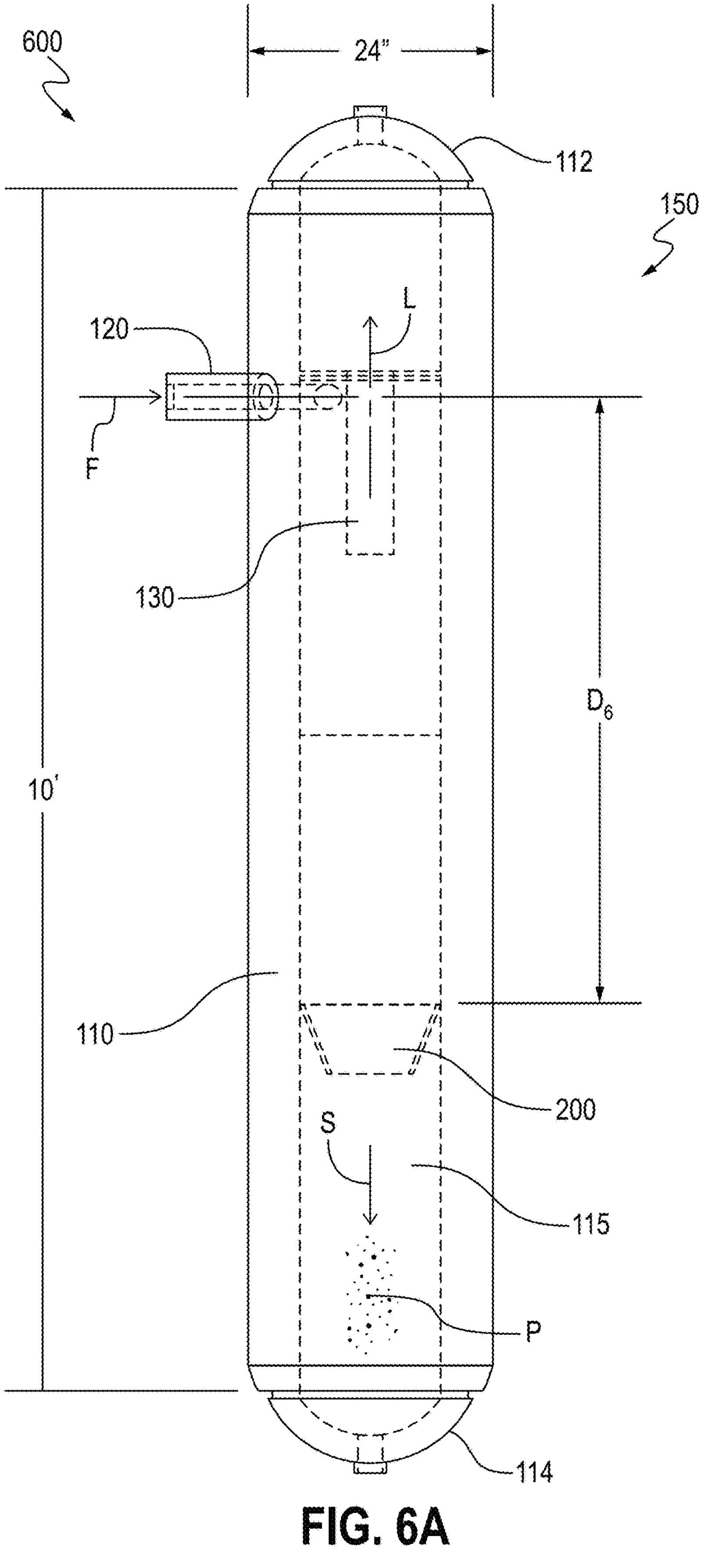
FIG. 6A is a side cross-sectional view of a cyclonic de-sander of the present invention, in a fourth embodiment. Here, the funnel is positioned a distance $D_6$ below the fluid inlet.

FIG. 6A is a side cross-sectional view of a cyclonic de-sander 600 of the present invention, in a fourth embodiment. De-sander 600 comprises the same outer dimensions and internal features as de-sanders 300, 400 and 500; however, in de-sander 600 the funnel 200 is positioned a distance $D_6$ below the fluid inlet 120. Distance $D_6$ is greater than distances $D_3$, $D_4$, and $D_5$ and may be, for example, 60 inches.

Figure 6B:
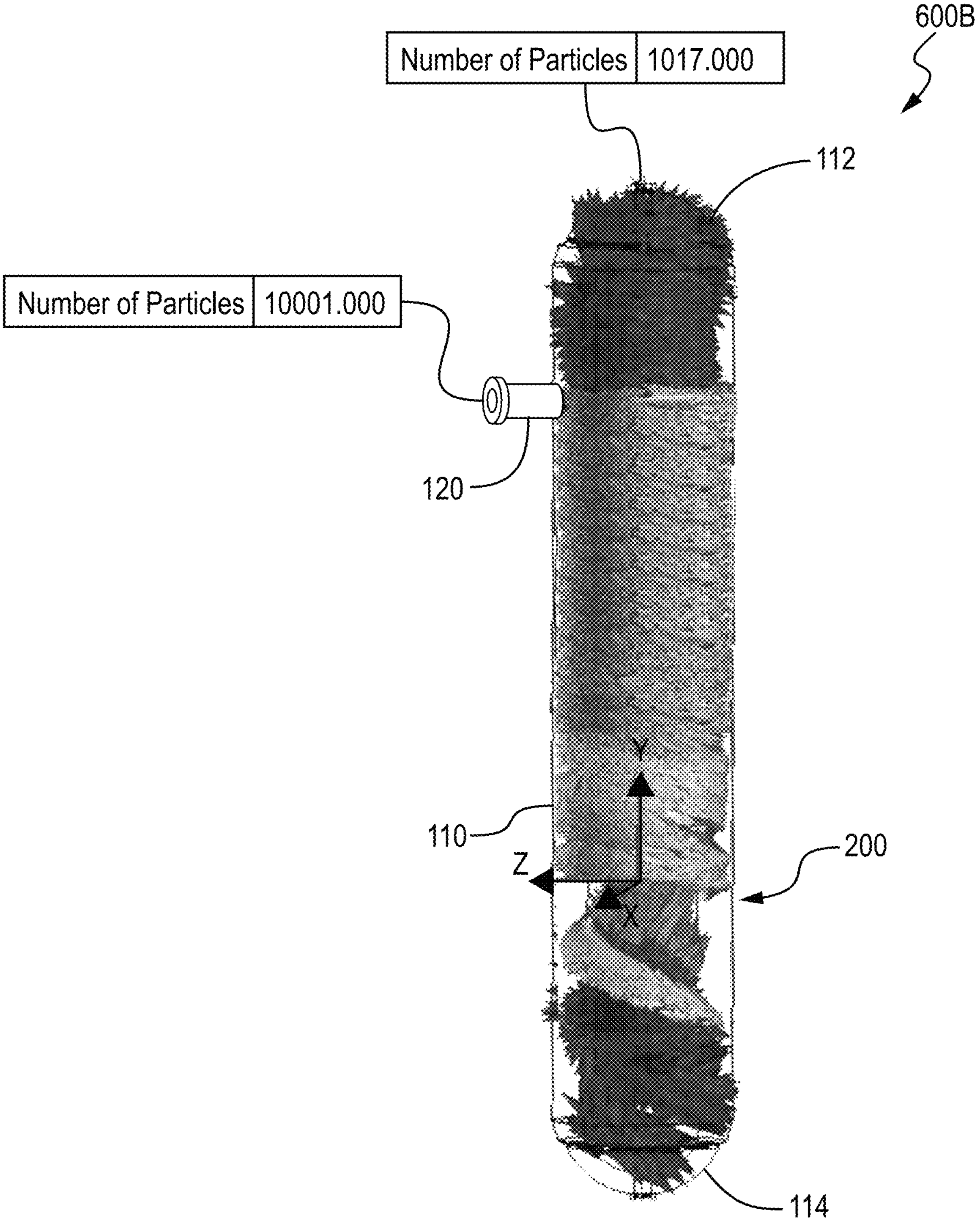
FIG. 6B is a computer-generated graphic using CFD analysis. The graphic shows different levels of particle separation within the cyclonic de-sander of FIG. 6A.

FIG. 6B is yet another computer-generated graphic 600B again using CFD analysis. The graphic 600B shows different levels of particle separation within the cyclonic de-sander 600 of FIG. 6A. It is observed that out of 10,001 granular particles assumed in the simulation, 1,017.00 particles escaped with the water stream L at the upper end 112 of the vessel 150. This greater distance $D_6$ is demonstrably ineffective for sand removal as compared with distances $D_3$, $D_4$, and $D_5$. Indeed, this is much worse than having no funnel 200 at all.

Figure 7A:
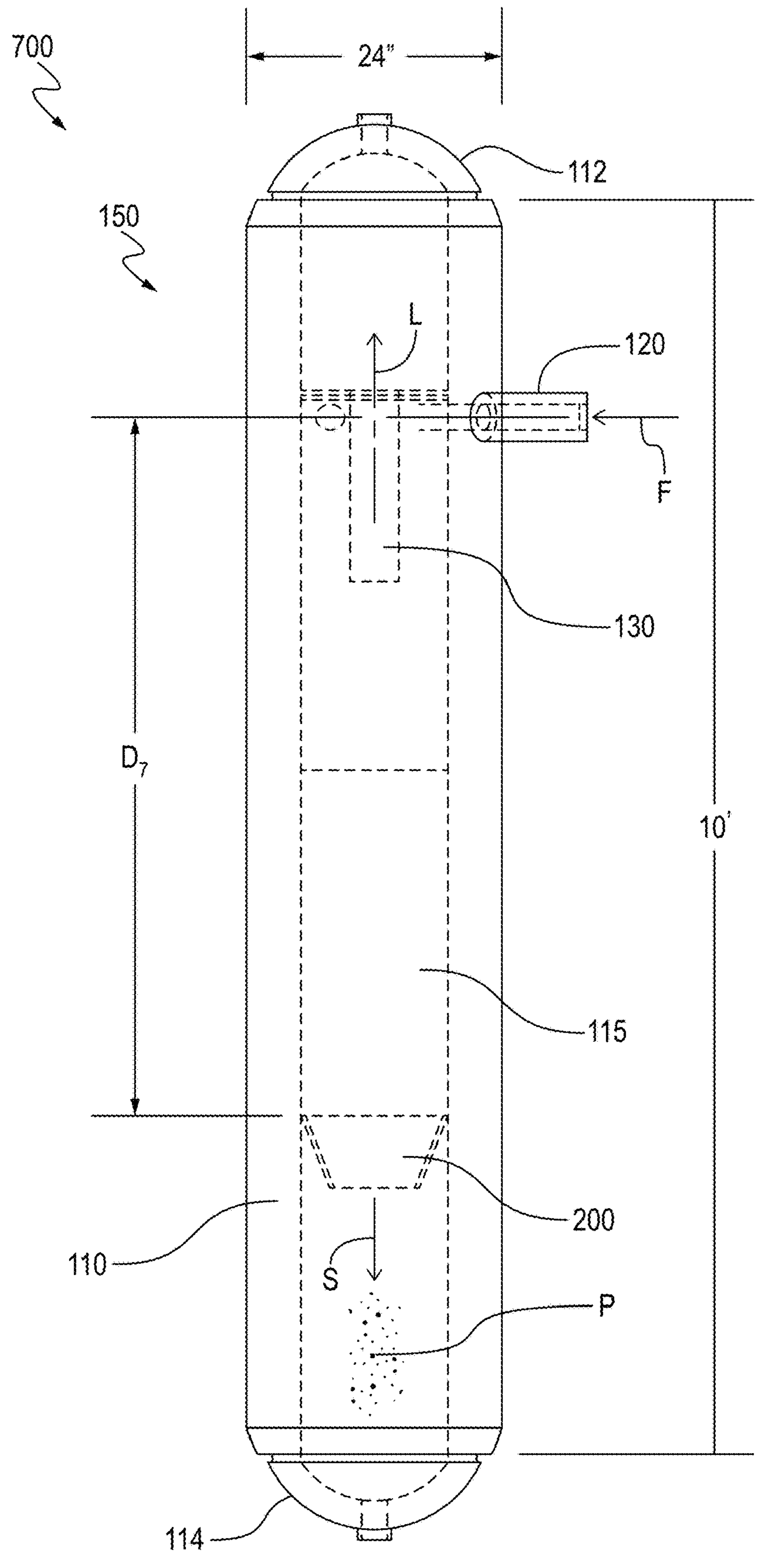
FIG. 7A is a side cross-sectional view of a cyclonic de-sander of the present invention, in a fifth embodiment. Here, the funnel is positioned a distance $D_7$ below the fluid inlet.

FIG. 7A is a side cross-sectional view of a cyclonic de-sander 700 of the present invention, in a fifth embodiment. De-sander 700 has the same outer dimensions and internal features as de-sanders 300, 400, 500 and 600, except that here the funnel 200 is positioned a distance $D_7$ below the fluid inlet 120. Distance $D_7$ is even greater than distance $D_6$ and may be, for example, 66 inches.

Figure 7B:
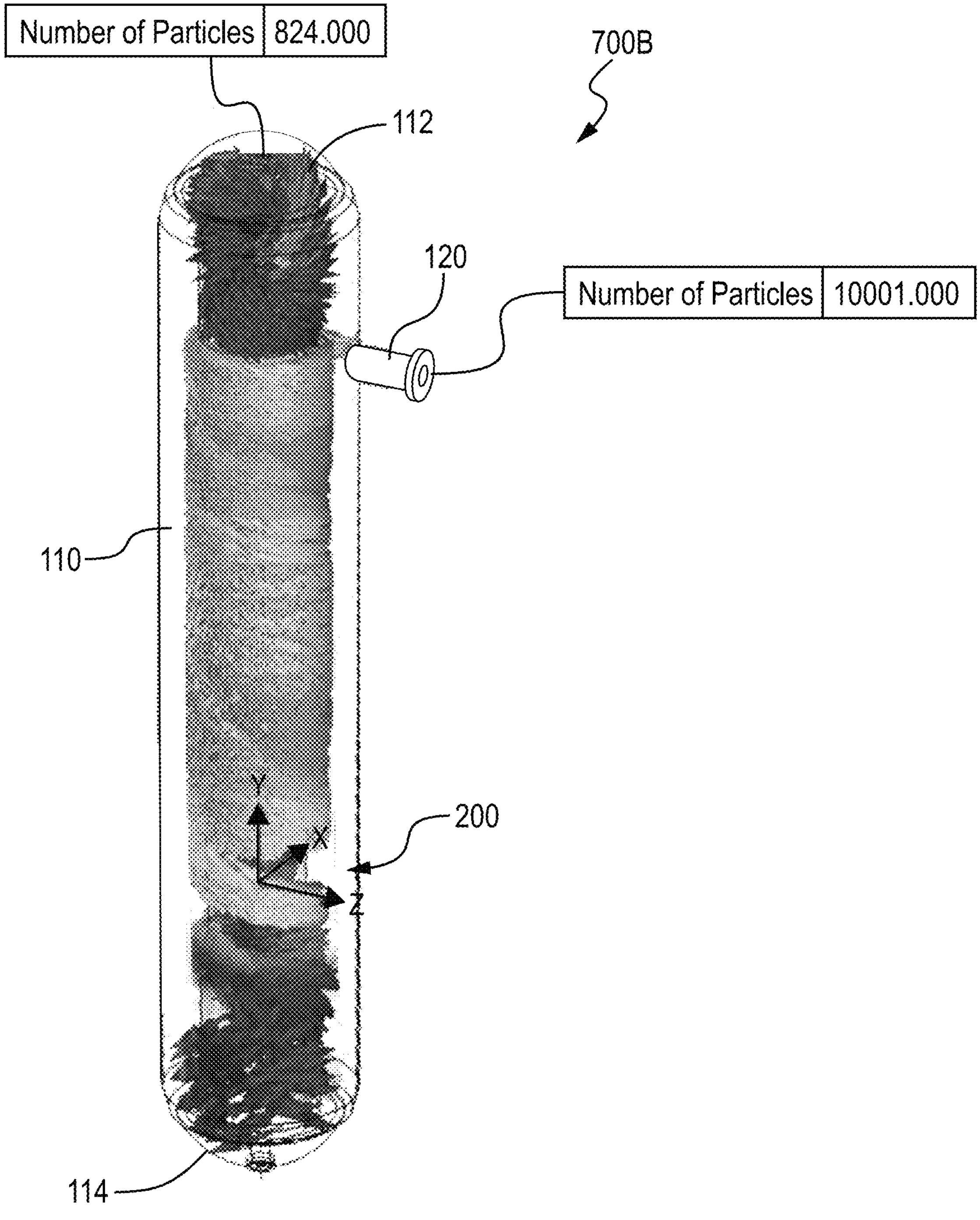
FIG. 7B is a computer-generated graphic using CFD analysis. The graphic shows different levels of particle separation within the cyclonic de-sander of FIG. 7A.

FIG. 7B is still another computer-generated graphic 700B using CFD analysis. The graphic 700B shows different levels of particle separation within the cyclonic de-sander 700 of FIG. 7A. It is observed that out of about 10,000 granular particles assumed in the simulation, 824.00 particles escaped with the water stream L at the upper end 112 of the vessel 150. This greater distance $D_7$, while performing better than distance $D_6$, is not as effective for sand removal as compared with distances $D_3$, $D_4$, and $D_5$.

Figure 8:
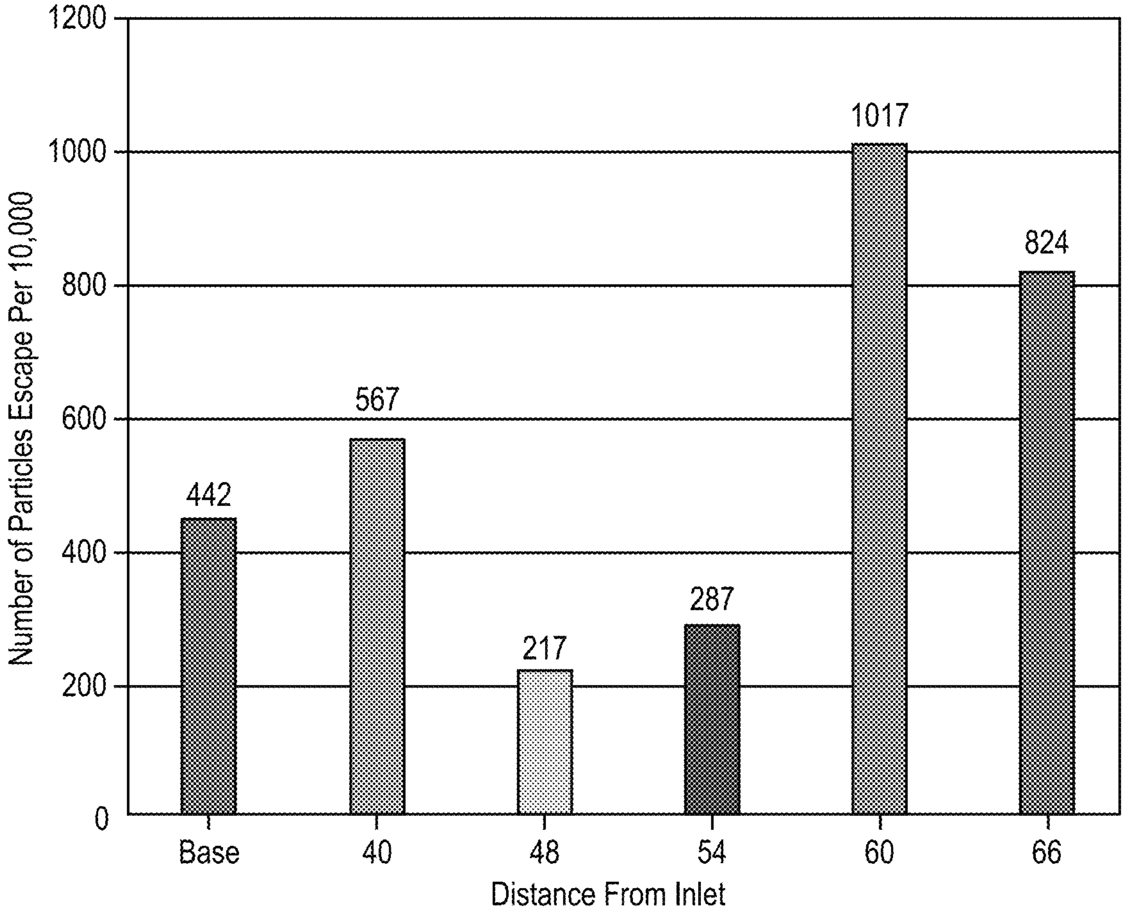
FIG. 8 is a bar chart showing relative amounts of sand particles removed from the pressure vessel in response to different positions of the funnel within the pressure vessel.

FIG. 8 is a bar chart 800 comparing the effectiveness of the cyclonic de-sanders 300, 400, 500, 600, and 700. The x-axis on the chart 800 represents a distance of the funnel 200 from the fluid inlet 120 (as shown in FIGS. 3A, 4A, 5A, 6A, and 7A). The y-axis represents the number of granular particles that escape, per 10,000. In this chart 800, the "base" does not comprise the funnel 200 at any position.

As can be seen in chart 800, the base allows 442 particles to escape out of nominally 10,000 particles. When an inverted cone (funnel 200 which comprises the frusto-conical body 210 having both upper 112 and lower 114 ends, is added at a distance of nominally 48 inches to 54 inches below the fluid inlet 120 centerline, the number of particles is reduced by approximately 35% to 50%.

Figure 9:
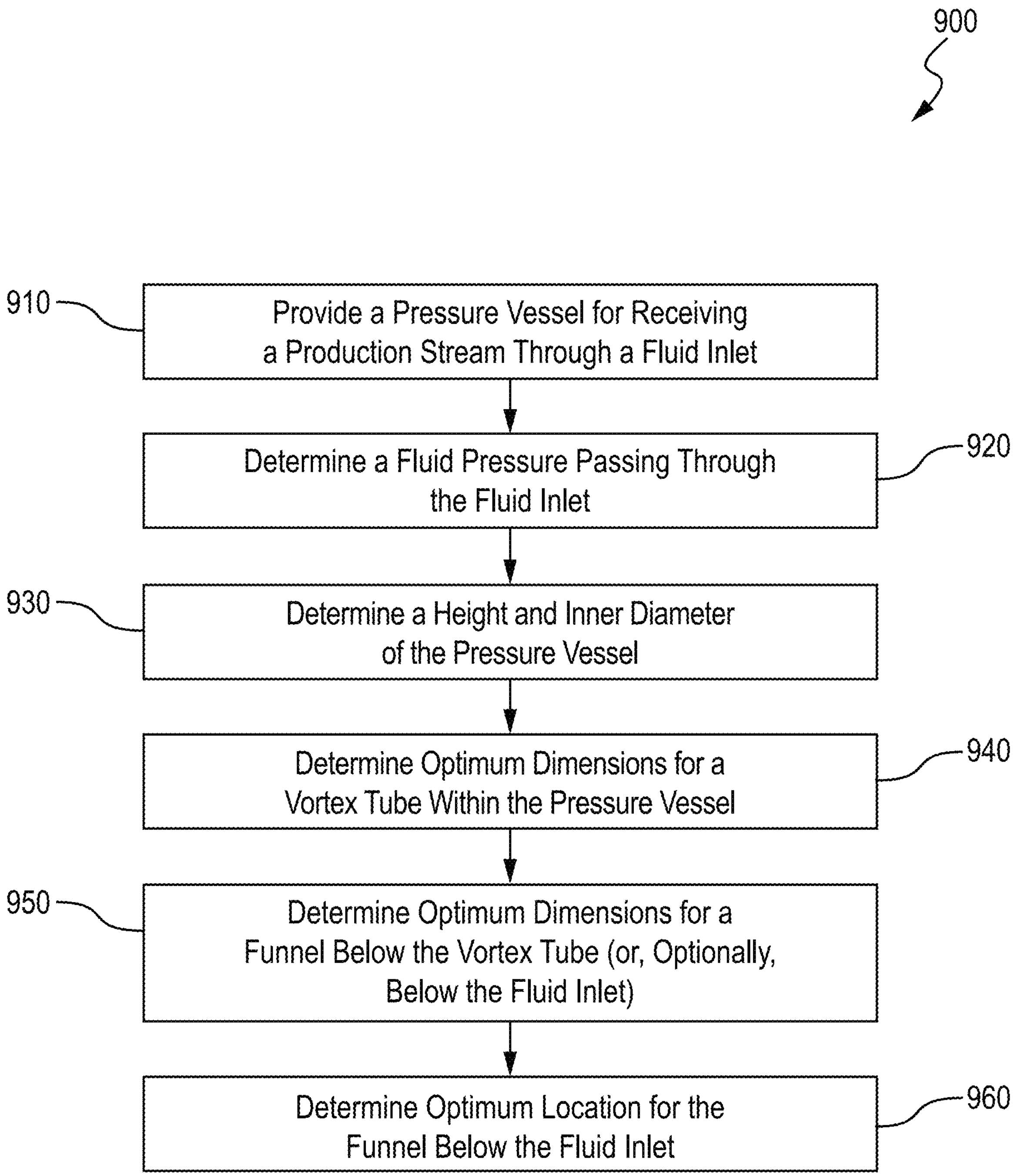
FIG. 9 is a flow chart showing steps for a method of operating a cyclonic de-sander, in one embodiment.

Based on the features presented in FIGS. 1A-1B, 2A-2C, and 5A-5B, a unique method for operating a cyclonic de-sander is presented. FIG. 9 provides a flow chart showing operational steps for a method 900 of operating a cyclonic de-sander, in one embodiment.

The method 900 first includes providing a pressure vessel. This is shown at Box 910. In the step of Box 910, the pressure vessel includes a fluid inlet. The fluid inlet is configured to receive a stream of production fluids under pressure. The pressure vessel may be, for example, in accordance with any of the pressure vessels presented in FIGS. 1A, 4A, or 5A.

The method 900 next comprises determining a fluid pressure passing through the fluid inlet. This is provided in Box 920. The pressure may be as high as 5,000 psig, or even 6,000 psig, or even 7,000 psig. In one aspect, liquid pressure within the pressure vessel is 6,000 psig and water flows at a rate of 80 to 100 bbl oil per hour. Fluids travel through the fluid inlet and are introduced into the pressure vessel in an eccentric manner.

The method 900 also includes determining a height and inner diameter of the pressure vessel. This is seen at Box 930. The purpose is to determine a processing capacity of the cyclonic de-sander. A distance D separates the fluid inlet from the upper end of the funnel. The distance $D_4$ is preferably about 35% to 55% of the overall length of the pressure vessel. Alternatively, the distance D represents between 35% and 45% of a total height of the interior volume of the pressure vessel. In one aspect, distance $D_4$ is 40 to 55 inches below the fluid inlet.

The method 900 additionally comprises determining optimum dimensions for a vortex tube within the pressure vessel. This is indicated at Box 940. Ideally, the fluid inlet and the vortex tube are both positioned above a mid-point of the height of the pressure vessel. Ideally, the vortex tube will have an upper end in fluid communication with a fluid outlet, and a lower end that is open to the operating environment within the pressure vessel. Preferably, the lower end of the vortex tube will extend below the fluid inlet between 4 and 12 inches. The vortex tube may be between 12 and 24 inches in length.

The method 900 further includes determining optimum dimensions for a funnel within the pressure vessel. This is shown at Box 950. The funnel defines a frusto-conical body. The body comprises an upper end and a lower end. The upper end has an upper opening which defines a first inner diameter. At the same time, the lower end has a lower opening that defines a second inner diameter. The upper end is in contact with the circular side wall of the pressure vessel. Additionally, the first inner diameter is larger than the second inner diameter.

In accordance with the frusto-conical profile, the body of the funnel is angled relative to the side wall of the pressure vessel. Determining dimensions of the funnel in Box 950 will include determining this angle of deviation. Determining dimensions of the funnel in Box 950 will also include determining a height of the funnel and determining the first and second inner diameters.

The method 900 additionally comprises determining an optimum location for the funnel below the fluid inlet. This is shown at Box 960. Preferably, the upper end of the funnel resides between 35 inches and 60 inches below the fluid inlet. Preferably, the lower end of the vortex tube is positioned 40 to 55 inches above the upper end of the funnel.

Positioning of the funnel in this manner optimizes the pressure drop through the funnel during fluid injection. In one aspect, the pressure drop is at least 10 psi below the funnel relative to above the funnel. More specifically, the funnel is configured to create a pressure drop of at least 10 psi below the funnel relative to the environment of the interior volume proximate the lower end of the vortex tube. In another aspect, the pressure drop is greater than 40 psi.

The method 900 provides a means of improving the efficiency of a cyclonic de-sander. In this respect, an improved separation of sand from a production stream is obtained. Stated another way, a drier sand slurry is released from the bottom of the pressure vessel. This avoids the need to re-run the water released from the lower end of the pressure vessel back through the de-sander.

The particular embodiments disclosed above are illustrative only, as the embodiments may be modified and practiced in different but equivalent manners apparent to those skilled in the art having the benefit of the teachings herein. Although the present embodiments are shown above, the subject matter disclosed herein is not limited to just these embodiments, but are amenable to various changes and modifications without departing from the spirit thereof.

While the discussion herein focuses primarily on fluid streams produced from hydrocarbon wells, there may be other situations in which it is desirable to remove sand from a fluid stream. This may include, for example, harvesting sea water that is the product of a dredging operation or filtering water from an aquifer encountered during a construction operation.

The particular embodiments and advantages disclosed above may be altered or modified in ways that would be obvious to a person of ordinary skill in the art based upon a hindsight review of the disclosure herein, and all such variations are considered within the scope and spirit of the application.

I claim:

1. A cyclonic de-sander for a fluid stream, comprising:
- a pressure vessel, wherein the pressure vessel has a side wall, an upper end, a lower end, and an interior volume;
- a fluid inlet configured to deliver the fluid stream into the interior volume of the pressure vessel in an eccentric manner, thereby forming a cyclone;
- a vortex tube residing vertically within the interior volume of the pressure vessel, wherein the vortex tube comprises an upper end in fluid communication with the upper end of the pressure vessel, and a lower end in fluid communication with the interior volume;
- a funnel residing within the interior volume of the pressure vessel below the fluid inlet and below the lower end of the vortex tube, wherein the funnel comprises:
  - a frusto-conical body;
  - an upper end defining a first inner diameter; and
  - a lower end defining a second inner diameter;
- wherein:
  - a distance D separates the fluid inlet from the upper end of the funnel, with the distance D representing between 35% and 55% of a total height of the interior volume of the pressure vessel;
  - the first inner diameter is greater than the second inner diameter; and
  - the first and second inner diameters are sized and configured to gravitationally receive solid particles from the fluid stream, and inhibit the travel of the solid particles back up the interior volume of the pressure vessel during operation;
- and wherein the funnel is configured to create a pressure drop of at least 10 psi below the funnel relative to an environment of the interior volume proximate the lower end of the vortex tube.

2. The cyclonic de-sander of claim 1, wherein:
- the fluid stream is a production stream from a hydrocarbon-producing well;
- the pressure vessel is between 8 and 12 feet in height;
- a longitudinal axis of the pressure vessel is vertical in orientation; and
- the upper end of the pressure vessel comprises an upper fluid valve.

3. The cyclonic de-sander of claim 2, wherein:
- the solid particles are primarily sand; and
- the lower end of the pressure vessel comprises a filtration medium configured to capture sand particles.

4. The cyclonic de-sander of claim 3, wherein
- the lower end of the vortex tube resides between 4 and 12 inches below the fluid inlet; and
- the upper end of the funnel resides between 40 and 55 inches below the fluid inlet.

5. The cyclonic de-sander of claim 4, wherein the vortex tube resides concentrically within the pressure vessel.

6. The cyclonic de-sander of claim 4, wherein the frusto-conical body of the funnel is at an angle of between 30 and 60 degrees relative to the side wall of the pressure vessel.

7. The cyclonic de-sander of claim 4, wherein the height of the funnel is between 4 and 8 inches.

8. A method of removing particles from a fluid stream, comprising:

providing an elongated pressure vessel, wherein the pressure vessel comprises:

a top end and a bottom end;

a side wall forming an inner diameter and defining an interior volume;

a vortex tube within the interior volume proximate the top end;

a fluid inlet extending through the side wall of the pressure vessel proximate the vortex tube, wherein the fluid inlet is positioned off-center relative to the pressure vessel to enable a stream of production fluids to be injected through the fluid inlet and into the pressure vessel in an eccentric manner; and a funnel residing within the pressure vessel, wherein the funnel is positioned below the vortex tube at a predetermined location within the pressure vessel and has predetermined dimensions to create a pressure drop of at least 10 psi below the funnel relative to a lower end of the vortex tube during an injection of the fluid stream;

injecting the fluid stream, under pressure, into the pressure vessel in the eccentric manner to form a fluid cyclone within the pressure vessel, wherein the fluid stream comprises sand particles;

determining a pressure of the fluid stream passing through the fluid inlet;

and determining a pressure of the fluid stream at a location below the funnel.

9. The method of claim 8, wherein:

the side wall has a circular profile;

the pressure at the fluid inlet is at least 5,000 psig;

the vortex tube resides vertically within the interior volume of the pressure vessel;

the vortex tube resides concentrically within the pressure vessel; and the vortex tube comprises an upper end in fluid communication with the upper end of the pressure vessel, and a lower end in fluid communication with the interior volume.

10. The method of claim 9, wherein:

the funnel resides within the interior volume of the pressure vessel below the fluid inlet; and the funnel comprises:

a frusto-conical body;

an upper end defining a first inner diameter; and a lower end defining a second inner diameter;

and wherein:

a distance D separates the fluid inlet from the upper end of the funnel, with the distance D representing between 35% and 55% of a height of the interior volume of the pressure vessel;

and wherein:

the first inner diameter is greater than the second inner diameter; and the first and second inner diameters are sized and configured to gravitationally receive solid particles from the fluid stream, and inhibit the travel of the solid particles back up the interior volume of the pressure vessel during operation.

11. The method of claim 10, wherein:

the fluid inlet and the vortex tube are both positioned above a mid-point of the height of the interior volume of the pressure vessel; and the lower end of the vortex tube extends below the fluid inlet between 4 and 12 inches.

12. The method of claim 11, wherein:

the body of the funnel is angled relative to the side wall of the pressure vessel, forming an angle of deviation as a part of the predetermined dimensions.

13. The method of claim 12, wherein:

the upper end of the funnel resides between 42 inches and 55 inches below the fluid inlet.

14. The method of claim 13, wherein:

the angle of deviation is between 30° and 60°.

15. The method of claim 13, wherein:

the funnel represents a first funnel;

the cyclonic de-sander further comprises a second funnel;

each of the first and second funnels is placed within the interior volume of the pressure vessel, in series, with the first funnel residing over the second funnel;

the second funnel also comprises:

a frusto-conical body;

an upper end defining a first diameter; and a lower end defining a second diameter;

wherein:

the first diameter of the second funnel is greater than the second diameter of the second funnel; and the upper end of the second funnel is positioned 3 to 8 inches below the first funnel.

16. The method of claim 10, wherein the upper end of the funnel engages an inner surface of the side wall of the pressure vessel.

* * * * *